United States Patent [19]
DiGiovanni et al.

[11] Patent Number: 5,659,644
[45] Date of Patent: Aug. 19, 1997

[54] FIBER LIGHT SOURCE WITH MULTIMODE FIBER COUPLER

[75] Inventors: David John DiGiovanni, Montclair; Stephen Gregory Grubb, Warren; Daryl Inniss, Princeton, all of N.J.; Ralph Stephen Jameson, Allentown, Pa.; Kenneth Lee Walker, New Providence, N.J.

[73] Assignee: Lucent Technologies Inc., Murray Hill, N.J.

[21] Appl. No.: 659,853

[22] Filed: Jun. 7, 1996

[51] Int. Cl.$^6$ .................................. G02B 6/26; H01S 3/30
[52] U.S. Cl. .......................... 385/31; 385/27; 385/38; 385/39; 385/49; 385/50; 385/98; 385/123; 372/6; 372/98; 372/102; 359/341; 359/115
[58] Field of Search ........................ 385/14, 15, 24, 385/27, 28, 30, 31, 37, 38, 39, 42, 44, 46, 47, 49, 50, 98, 123; 372/6, 98, 102, 108; 359/341, 115, 124, 127, 130, 134

[56] References Cited

U.S. PATENT DOCUMENTS

| | | | |
|---|---|---|---|
| 5,058,980 | 10/1991 | Howerton | 385/31 |
| 5,077,817 | 12/1991 | Shang | 385/46 |
| 5,140,456 | 8/1992 | Huber | 359/341 |
| 5,235,604 | 8/1993 | Chinen | 372/6 |
| 5,367,527 | 11/1994 | Gruneisen | 372/9 |
| 5,422,987 | 6/1995 | Wyatt et al. | 372/6 |
| 5,457,760 | 10/1995 | Mizrahi | 385/37 |

*Primary Examiner*—Brian Healy
*Attorney, Agent, or Firm*—Michael J. Urbano

[57] ABSTRACT

In an optical fiber light source a section of multimode fiber is interposed between an energizing laser (e.g., a diode laser) and a single mode fiber active medium. In a preferred embodiment the single mode fiber active medium is surrounded by a multimode cladding coupled to the multimode fiber. The source may serve as a pump laser for a fiber amplifier or as an amplified spontaneous emission source. Arrangements for coupling several energizing lasers to the active medium are also described.

26 Claims, 2 Drawing Sheets

FIBER LIGHT SOURCE WITH MULTIMODE FIBER COUPLER

BACKGROUND OF THE INVENTION

This invention relates to optical fiber light sources as well as to optical fiber amplifiers (FAMPs).

In conventional FAMPs, signal light to be amplified propagates through a section of fiber that is doped to provide optical gain over a range of wavelengths. Gain is induced by coupling suitable pump light from a pump laser into the gain section while the signal light is propagating therethrough. The pump light may be co-propagating or counter-propagating, or both, depending on system considerations. Since the signal light ($\lambda_s$) and the pump light ($\lambda_p$) have different wavelengths, the coupling is advantageously done by means of a wavelength division multiplexer (WDM).

In one prior art design the pump laser is a diode laser which is coupled through a single mode fiber and the WDM to an Er-doped fiber. For FAMP operation at about $\lambda_s$=1550 nm the diode laser illustratively generates pump light at 980 nm. In other designs the pump laser is a fiber laser, which itself is energized by a diode laser, and is likewise coupled through a single mode fiber and the WDM to an ER-Yb-doped fiber. For FAMP operation at about $\lambda_s$=1550 nm the fiber laser generates pump light at 1060 nm.

In the remainder of this description, we will concentrate primarily on FAMPs which are pumped by fiber lasers. In a typical design of a fiber laser, an active fiber medium is interposed between a pair of fiber gratings which form a resonator. Energizing light from a diode laser is coupled, for example, through one of the gratings (input grating) into the active medium; pump light generated in the active medium finds egress through the other grating (output grating).

The active medium of the fiber laser, typically a fiber section doped with Yb or Nd, is capable of lasing over a relatively broad band. Lasing at a particular wavelength (e.g., 1060 nm) that even low level (e.g., 4%) reflections may be sufficient to induce lasing at these undesired wavelengths. Such low level reflections can occur, for example, at the cleaved end face of the fiber section to which the diode laser is coupled.

Thus, there is a need in the fiber laser art to prevent such lasing at undesired wavelengths.

This FAMP design also suffers from another problem which is related to the reliability of the diode laser used to energize the fiber laser. More specifically, although the input grating of the fiber laser is nominally 100% reflective at the fiber laser wavelength, it is less than perfect. Therefore, a portion of the fiber laser light is incident on the diode laser. If the intensity of such incident light exceeds well-known levels, the diode laser may be damaged, and the reliability of the FAMP may be compromised.

Consequently, there is a need in the art for a FAMP design which reduces the intensity of fiber laser pump light incident on the diode laser.

Yet another problem of this FAMP design is related to unwanted reflections of signal light. These reflections affect the performance of a FAMP via a phenomenon known as multipath interference (MPI); that is, imperfect WDMs allow a portion of the signal light to be coupled to the fiber laser where it is reflected back toward the WDM. The reflected signal light is coupled through the WDM and, after being amplified by the gain section of the FAMP, reaches the output of the amplifier out of phase with the original signal light. The out-of-phase component raises the noise floor of the system.

Therefore, there is also a need in the FAMP art to reduce signal reflections which produce MPI.

SUMMARY OF THE INVENTION

These problems are addressed by a fiber laser design in which a section of multimode fiber is interposed between a diode laser, used to energize the fiber laser active medium, and the fiber laser itself used as a light source. The multimode section dramatically decreases the intensity of any fiber laser light incident on the diode laser, thereby improving its reliability. It also reduces significantly the ability of undesired wavelengths to reach the threshold for lasing in the fiber laser. When used as the source of pump light in a FAMP, the multimode section also serves to attenuate spurious signal light carried on a single mode fiber and coupled through a WDM to the fiber laser, thus reducing the adverse effects of MPI.

The invention is also useful in amplified spontaneous emission (ASE) fiber sources. The latter find application, for example, in imaging, instrumentation, gyroscopes, and sliced spectral sources for wavelength division multiplexed systems.

BRIEF DESCRIPTION OF THE DRAWINGS

The invention, together with its various features and advantages, can be readily understood from the following more detailed description taken in conjunction with accompanying drawings, in which.

Figure 2:
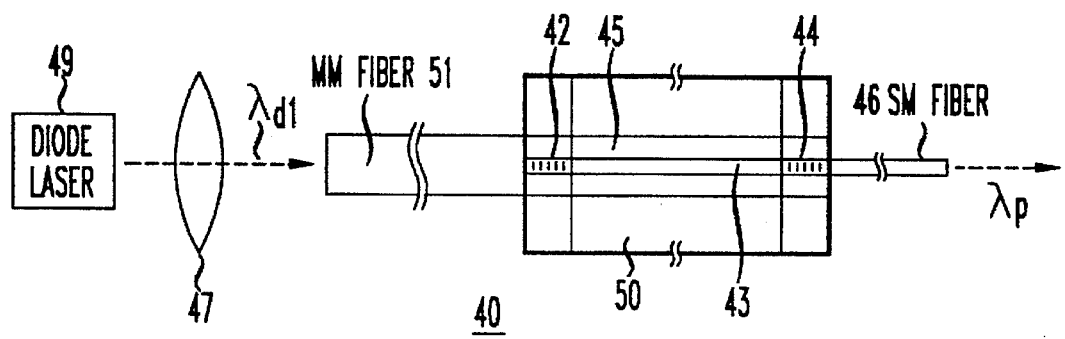
FIG. 2 is a schematic of a fiber laser in accordance with one embodiment of the invention.
Figure 4:
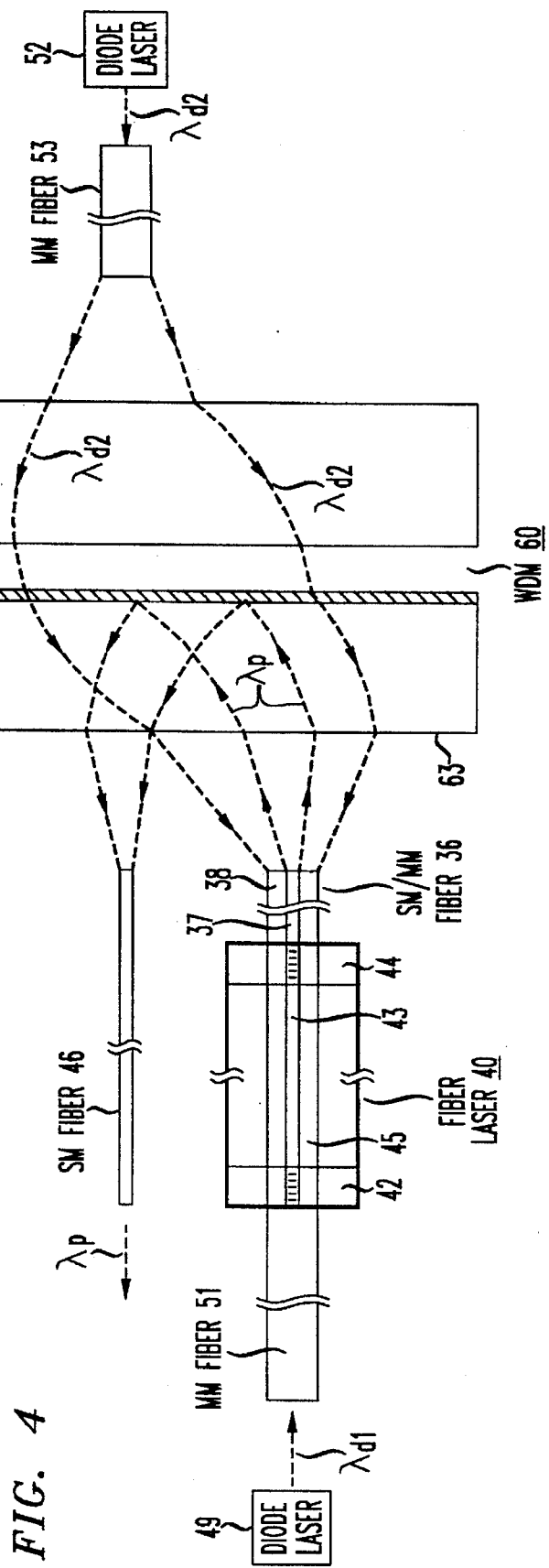
FIG. 4 is a schematic of a WDM for use in the laser arrangement of FIG. 3.

In the interests of clarity of illustration, the FIGURES have not been drawn to scale, and in FIGS. 2 and 4 only the cores of fibers 36, 46, 51 and 53 have been shown (i.e., their claddings have been omitted).

DETAILED DESCRIPTION

Figure 1:
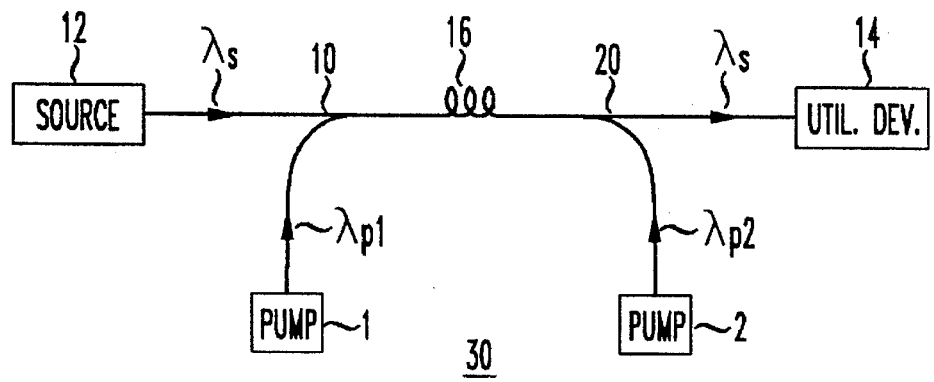
FIG. 1 is a schematic of a FAMP.

With reference now to FIG. 1, we describe a well-known optical communication system comprising a source 12 of signal light $\lambda_s$ to be amplified, a utilization device 14 to which the signal light is to be delivered, and a FAMP 30 for amplifying the signal light. The source and utilization device may be pieces of terminal equipment, sections of transmission fiber, or other FAMPs in the system, etc. In the latter case, the system would include a multi-stage FAMP configuration. The FAMP 30 is illustratively depicted as being double pumped; i.e., two pump lasers 1 and 2 are coupled to fiber gain medium 16 via suitable couplers such as WDMs 10 and 20, respectively. Pump laser 1 provides co-propagating pump light $\lambda_{p1}$, whereas pump laser 2 provides counter-propagating pump light $\lambda_{p2}$. However, depending on the gain one desires to generate in gain medium 16, as well as other system, cost and complexity considerations, it may suffice to employ only a single pump laser and hence a single WDM.

In accordance with one embodiment of our invention, a FAMP is provided with a pump laser, illustratively a fiber laser 40 of the type shown in FIG. 2. Advantageously, our pump laser design reduces reliability and MPI problems, as well as the tendency of the laser 40 to lase at undesired wavelengths. Laser 40 comprises a section 43 of single mode fiber designed to provide optical gain when suitably pumped and a pair of single mode fiber grating reflectors 42 and 44 which form an optical resonator with the gain section 43 therein. (Grating reflectors 42 and 44 are referred to herein as input and output gratings, respectively.) Note, in an alternative embodiment (not shown), grating reflectors 42 and 44 may be closely spaced (i.e., spaced apart a distance which is a small fraction of the total length of the active medium, resulting in a laser oscillator/amplifier combination of the type described by one of us (S. Grubb) in U.S. Pat. No. 5,473,622 issued on Dec. 5, 1995 and incorporated herein by reference.

In the FAMP of FIG. 2, a segment 46 of single mode transmission fiber couples pump light $\lambda_p$ to, for example, the FAMP gain section 16 of FIG. 1 via a WDM. On the other hand, the gain section 43 of the pump laser 40 itself is energized (i.e., pumped) by a diode laser 49 which, as shown in FIG. 2, is coupled via a lens arrangement 47 and input grating 42 to gain section 43. Lens arrangement 47 may be a single lens or a combination of lasers, but in any case is optional; other well-known coupling schemes, such as a butt coupling, are also suitable and may even be preferred in some cases. Importantly, in order to reduce the intensity of spurious pump light ($\lambda_p$) transmitted through input grating 42 toward laser diode 49, a section 51 of multimode fiber is interposed between input grating 42 and the laser diode 49. Preferably, fiber section 51 supports multimode light, but has no single mode core to support single mode light. The larger cross-section of the core of the multimode fiber (compared to the core of the single mode gain section 43) effectively attenuates the spurious light, thereby providing significant protection of the diode laser from damage. MPI is likewise reduced inasmuch as any signal light, which reaches the pump laser via the imperfect WDM, is reflected back to the WDM at significantly reduced power levels. Hence, at the output of the FAMP any delayed signal light is also at considerably reduced power levels.

Another advantage of reducing the power level of spurious pump light incident on the laser diode, is the reduction of mode-hopping which can be induced when such pump light enters the active region of the laser diode; e.g., this problem is extant in fiber lasers which generate 1060 nm pump light in a Yb doped-core silica fiber gain section 43 when pumped by 700–985 nm light.

Still another advantage is that the multimode section 48 reduces the effective reflectivity at the end of input grating 42 by as much as several orders of magnitude, thereby greatly reducing the likelihood that undesired wavelengths will lase. (An example of an undesired wavelength is the high gain 1100 nm line in a fiber laser (Nd or Yb-doped) designed to lase at 1060 nm.) This same feature finds application in an amplified spontaneous emission (ASE) fiber source, e.g., the device of FIG. 2 in which gratings 42 and 44 are omitted and the single mode fiber 46 is either omitted or replaced with a suitable multimode fiber.

Although not explicitly shown in the schematic figures, the joining of the various sections of fibers, including the multimode fiber section 51 to the fiber section containing input grating 42, may be accomplished by well-known, low loss fusion splices of the type described in U.S. Pat. No. 5,074,633 granted to L. G. Cohen et al. on Dec. 24, 1991 and incorporated herein by reference. Moreover, the fiber sections are shown in FIG. 2 with schematic breaks in order to depict that these sections are typically part of much longer lengths of fiber (often several meters long to tens of meters long). The fiber laser 40 is preferably designed to enhance the coupling between the pump light from laser diode 49 and the single mode gain section 43. To this end, the "star" fiber design described by one of us, D. DiGiovanni, in copending application Ser. No. 08/561,682 filed on Nov. 22, 1995 is particularly advantageous. This application is incorporated herein by reference. Briefly, an exemplary star fiber includes a single mode silica core or gain section 43 (having a nominally circular cross-section) surrounded by a lower refractive index silica pump cladding 45 (having a star-like cross-section). The latter is, in turn, surrounded by a yet lower index polymer cladding 50 (having a nominally circular cross-section). In addition, the cross-sectional area of the core of the multimode fiber 51 is preferably slightly less than or equal to that of the pump cladding 45; furthermore it has a numerical aperture less than or equal to that of cladding 45. The cladding (not shown) of multimode fiber 51 may comprise silica or a polymer having a lower refracture index than its core.

In operation, the pump light ($\lambda_{d1}$) from laser diode 49 propagates through the core of multimode fiber 51 into the pump cladding 45 of the fiber laser 40. The star-like cross-section of the pump cladding serves to reflect the pump light $\lambda_{d1}$ so that it intersects the single-mode core of gain section 43 a plurality of times, thereby causing it to lase at a wavelength $\lambda_p$.

The fiber gratings are advantageously Bragg gratings which are UV-written in single mode fiber using, illustratively, the technique described in *Optics Letters*, Vol. 14, No. 15 (Aug. 1, 1989), pp. 823–825, which is incorporated herein by reference.

The WDMs 10 and 20 and other devices for routing signals are described, for example, in "*Optical Fiber Amplifiers: Design & System Applications,*" Bjarklev, Artech House, Inc., Boston-London 1993, p. 160–161, which is incorporated herein by reference.

The laser diode 49 may be single laser, an array of lasers, a single laser with multiple active stripes, or any other design suitable for coupling sufficient power at $\lambda_{d1}$ into the multimode fiber 51. The composition of the laser diode, in particular its active region, is determined by the desired wavelength $\lambda_{d1}$; for example, AlGaAs laser diodes are suitable for operation at $\lambda_{d1}$ wavelengths in the range of about 800–870 nm, whereas InGaAs laser diodes are suitable for wavelengths in the range of about 870–1000 nm.

EXAMPLE 1

This example describes a FAMP for amplifying signal light at $\lambda_s$=1550 nm using an Er-Yb-doped fiber 16 which was about 8 m in length. A single, co-propagating fiber pump laser 1 was coupled to the fiber by a commercially available WDM 10.

The pump laser 1, of the type shown in FIG. 2, included GaAs-AlGaAs laser diode 49 which delivered 805 nm light at 2.0 W of power into about a 1 m section of multimode fiber 51. The latter had a core diameter of 100 μm and was fusion spliced to a short (2 m) Nd-doped single mode "star" fiber section containing a high reflectivity (nominally 100% at 1060 nm) input grating 42. The latter was fusion spliced to about 75 m of single mode, Nd-doped core, silica "star" fiber which lased at 1060 nm and 500 mW of power (about 80 mW threshold and about 30% slope efficiency). The other end of the star fiber section was fusion spliced to a short (2 m) Nd-doped, "star" single mode section containing a low reflectivity (about 20% at 1000 nm) output grating 44. The latter was in turn fusion spliced to single mode fiber 46 and hence to WDM 10.

With this design, the spurious light reaching the laser diode was reduced by about 50 dB, as compared to only about 20 dB for designs without the multimode section 51. Other performance characteristics: the FAMP incorporating this pump laser generated 200 mW of power at 1550 nm; the noise figure decreased from about 7.8 to 4.8 dB over the wavelength range of about 1530 to 1564 nm.

EXAMPLE 2

In this example, a counter-propagating pump was used instead of the co-propagating pump of Example 1. The output power and noise figures decreased from about 9.2 to 5.4 dB over the range of 1525 to 1565 nm.

Other Embodiments

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

Figure 3:
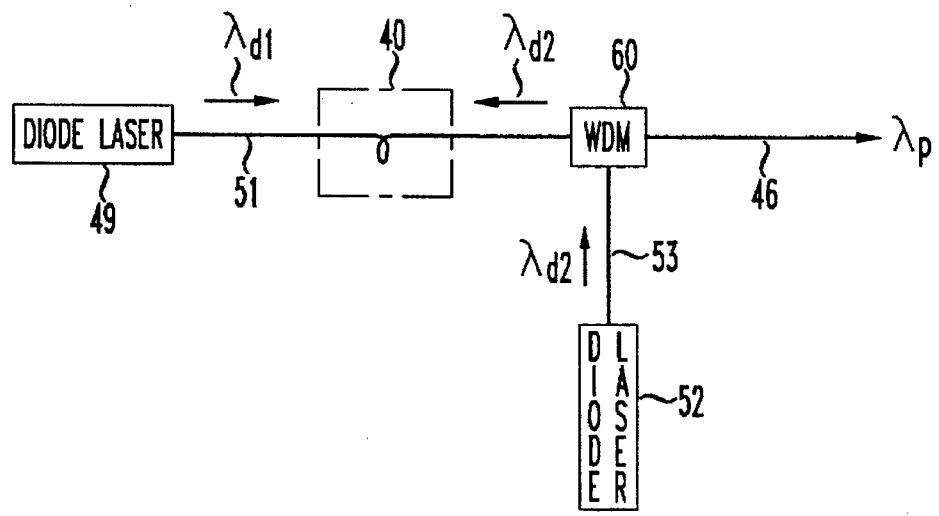
FIG. 3 is a schematic of a double-pumped fiber laser arrangement.

In particular, in accordance with another aspect of our invention, it may be desirable to couple more than one diode laser to the active region of a single fiber laser or ASE device. Thus, as shown in FIG. 3, a pair of diode lasers 49 and 52 are coupled to multimode fiber sections 51 and 53, respectively. The multimode fiber 51 is coupled, in the manner described above (FIG. 2), to deliver diode energizing light $\lambda_{d1}$ to the active region of fiber light source (e.g., a laser 40, or ASE device). On the other hand, multimode fiber 53 and the single mode fiber 46 are coupled to the fiber laser 40 via a three-port WDM 60. Multimode fiber 53 delivers energizing light $\lambda_{d2}$ from diode laser 52 to the active region of laser 40, whereas single mode fiber 46 delivers the output $\lambda_p$ of laser 40 to the gain section 16 (FIG. 1) of a FAMP.

Turning now to FIG. 4, the WDM 60 illustratively comprises first and second lenses 62 arranged in tandem and a wavelength selective reflector 66 interposed therebetween. Reflector 66 is highly transmissive at the wavelengths $\lambda_{d1}$ and $\lambda_{d2}$ of the diode lasers 49 and 51, respectively, but highly reflective at the wavelength $\lambda_p$ of the fiber laser. In an exemplary embodiment, the lenses are well-known cylindrical, GRIN rod lenses designed to focus the $\lambda_p$ light from the single mode core gain section 43 of laser 40 into the single mode core of fiber 46, and to focus the $\lambda_{d2}$ light of diode laser 52 into the multimode (pump) cladding 45 of fiber laser 40, i.e., directly into cladding 45 or, as shown, via a hybrid fiber section 36 which has both a single mode core 37 and a multimode core 38. Of course, section 36 may be a separate fiber fused to laser 40 or merely an extension of the gain section 43 and cladding 45 of laser 40. In either case, the section 36 needs to support both single mode and multimode light.

In order to reduce back reflections of wavelengths near $\lambda_p$ into the single mode core gain section 43, it is desirable to include an AR coating on the front surface 63 of lens 62 or to tilt that surface at a small angle to the axis of gain section 43, or both. Alternatively, or additionally, the end face of fiber 36 may be tilted or AR coated. End faces of other fibers and/or lenses may similarly be tilted or AR coated.

We note that multimode fiber 53 and the multimode pump cladding 45 of laser 40 need not have the same numerical aperture (NA). Indeed, the lenses and NAs can be designed so that fiber 53 has a larger multimode core; e.g., fiber 53 could have a 200 μm multimode mode size, whereas the multimode pump clad 45 of laser 40 could have a 100 μm mode size. This design would increase the power coupling from the diode laser 52 into the active region of the fiber laser.

In an alternative embodiment (not shown), fiber 53 and fiber 36 may be positioned on the same side of lens 62, with fiber 46 positioned facing lens 64. In this case, reflector 66 is highly transmissive at wavelength $\lambda_p$ to allow coupling of $\lambda_p$ to fiber 46 and reflective at $\lambda_{d2}$ to allow coupling of these wavelengths to laser 40. More specifically, light from fiber 53 is coupled to multimode core 38 of fiber 36 by means of lens 62 and reflector 66, whereas light from the single mode core 37 of fiber 36 is coupled to single mode fiber 46 by lens 62 and lens 64.

In still another embodiment (not shown), it may be desirable to position the output grating 44 in the single mode fiber 46, rather than in the single mode core 43 of laser 40. In such an arrangement, the WDM 60 is an intracavity device (i.e., it is positioned in the optical path between input grating 42 and output grating 44.

The invention claimed is:

1. An optical fiber amplifier comprising
   an optical fiber for providing gain to an input optical signal thereon when said fiber is supplied with an optical pump signal,
   a source of said pump signal characterized in that said source comprises
   a resonator including a single mode fiber gain section capable of lasing at the wavelength of said pump signal,
   laser means for energizing said gain section, and
   a first multimode fiber section for coupling said laser means to said gain section.

2. The amplifier of claim 1 further characterized in that said laser means comprises a first diode laser.

3. The amplifier of claim 2 further characterized in that said resonator comprises single mode fiber input and output gratings, said gain section is disposed between said gratings, said first diode laser is coupled through said first multimode section to said input grating and said pump signal emanates from said second grating.

4. The amplifier of claim 2 further characterized in that said resonator also includes a multimode cladding surrounding said single mode gain section.

5. The amplifier of claim 4 further characterized in that said gain section and said cladding comprise a star fiber.

6. The amplifier of claim 5 wherein said gain section is doped with a lasing species selected from the group consisting of Nd and Yb.

7. The amplifier of claim 6 wherein said first diode laser generates light a wavelength in the range of about 800–1000 nm, said pump signal has a wavelength in the range of about 1020–1090 nm, and said input signal has a wavelength in the range of about 1525–1565 nm.

8. The amplifier of claim 4 wherein said multimode fiber section includes a multimode core for guiding light from said laser means to said gain section but includes no single mode core for guiding said pump signal.

9. The amplifier of claim 8 further characterized in that
   said laser means also comprises a second diode laser and a second multimode fiber section coupled to said second diode laser,
   a single mode output fiber,
   a wavelength division multiplexer for coupling said output fiber to said gain section, and for coupling said second multimode fiber section to said multimode cladding.

10. The amplifier of claim 9 further characterized in that said multiplexer comprises,
    first and second lenses arranged in tandem, and
    a wavelength selective reflector disposed between said lenses, said reflector having relatively high reflectivity at the wavelength at which said gain section lases and having relatively lower reflectivity at the wavelength of said diode lasers, and said gain section and said output fiber are positioned on one side of the combination of said lenses, and said second multimode fiber is positioned on the opposite side of said combination.

11. The amplifier of claim 9 further characterized in that said multiplexer comprises first and second lenses arranged in tandem, and a wavelength selective reflector disposed between said lenses, said reflector having relatively high reflectivity at the wavelength of said diode laser and having relatively lower reflectivity at the wavelength at which said gain section lases, and said gain section and said second multimode fiber are positioned on one side of the combination of said lenses and said output fiber is positioned on the opposite side of said combination.

12. A fiber optical amplifier comprising a single mode optical fiber doped with Er and Yb for providing gain to an input optical signal having a wavelength in the range of about 1525–1565 nm when supplied with an optical first pump signal at a wavelength in the range of about 1020–1090 nm, a fiber laser for generating said first pump signal, a wavelength division multiplexer for coupling said first pump signal and said input signal to said Er-Yb doped fiber, said fiber laser comprising a single mode fiber core doped with Nd or Yb and a multimode fiber cladding surrounding said core, fiber input and output gratings on said single mode core to form a resonator, said input grating having a relatively high reflectivity and said output grating having a relatively lower reflectivity both as measured at the wavelength of said first pump signal, a diode laser for generating a second pump signal at a wavelength in the range of about 800–1000 nm, and a multimode fiber section for coupling said second pump signal through said input grating into said multimode cladding.

13. A fiber light generator comprising a single mode fiber section having a doped core capable of emitting light in a certain wavelength first range when said core absorbs energizing light in a second wavelength range, a multimode fiber cladding surrounding said core, a source of said energizing light, and a first multimode fiber section coupling said source to said multimode cladding.

14. The generator of claim 13 wherein said single mode fiber section and said multimode fiber cladding are included within a star fiber.

15. The generator of claim 14 wherein said core is doped with lasing species selected from the group consisting of Nd and Yb.

16. The generator of claim 13 for use as a laser and further including a pair of spaced-apart, fiber grating reflectors forming a resonator which includes said single mode fiber section.

17. The generator of claim 13 wherein said source comprises a first diode laser.

18. The generator of claim 17 wherein said first diode laser lases at a wavelength in the range of about 800–1000 nm.

19. The generator of claim 16 wherein said doped core emits light in the range of about 1020–1090 nm.

20. The generator of claim 17 wherein said source further comprises a second diode laser and a second multimode fiber section coupled thereto, and further including an output path, a wavelength division multiplexer for coupling said output path to said single mode fiber section and for coupling said second multimode fiber section to said multimode cladding.

21. The generator of claim 20 wherein said multiplexer comprises first and second lenses arranged in tandem, and a wavelength selective reflector disposed between said lenses, said reflector having relatively high reflectivity at a wavelength at which said single mode core emits light and having relatively lower reflectivity at the wavelength at which said diode lasers emit light, and said single mode fiber section and said output path are positioned on one side of the combination of said lenses and said second multimode fiber section is positioned on the opposite side of said combination.

22. The generator of claim 20 further characterized in that said multiplexer comprises first and second lenses arranged in tandem, and a wavelength selective reflector disposed between said lenses, said reflector having relatively high reflectivity at the wavelength at which said diode lasers emit light and having relatively lower reflectivity at the wavelength at which said single mode core emits light, and said gain section and said second multimode fiber are positioned on one side of the combination of said lenses and said output fiber is positioned on the opposite side of said combination.

23. A wavelength division multiplexer comprising a combination of first and second lenses arranged in tandem, a wavelength selective reflector disposed between said lenses, said reflector having a higher reflectivity at a first wavelength of light than at a second, a single mode fiber positioned on one side of said combination for carrying single mode light at said first wavelength, a multimode fiber positioned on the opposite side of said combination for carrying multimode light at said second wavelength, a hybrid fiber positioned on said one side and having both a single mode core for carrying single mode light at said first wavelength and having a multimode core for carrying multimode light at said second wavelength, said lenses being adapted to couple multimode light from said multimode fiber into the multimode core of said hybrid fiber and to couple single mode light from said single mode core of said hybrid fiber into said single mode fiber.

24. A wavelength division multiplexer comprising a combination of first and second lenses arranged in tandem, a wavelength selective reflector disposed between said lenses, said reflector having a higher reflectivity at a first wavelength of light than at a second, a single mode fiber positioned on one side of said combination for carrying single mode light at said first wavelength, a multimode fiber positioned on the opposite side of said combination for carrying multimode light at said second wavelength, a hybrid fiber positioned on said opposite side and having both a single mode core for carrying single mode light at said first wavelength and having a multimode core for carrying multimode light at said second wavelength, said lenses being adapted to couple multimode light from said multimode fiber into the multimode core of said hybrid fiber and to couple single mode light from said single mode core of said hybrid fiber into said single mode fiber.

25. The amplifier of claim 1 wherein said first multimode section is located external to said resonator.

26. The generator of claim 16 wherein said first multimode section is located external to said resonator.

* * * * *